Patented Nov. 13, 1945

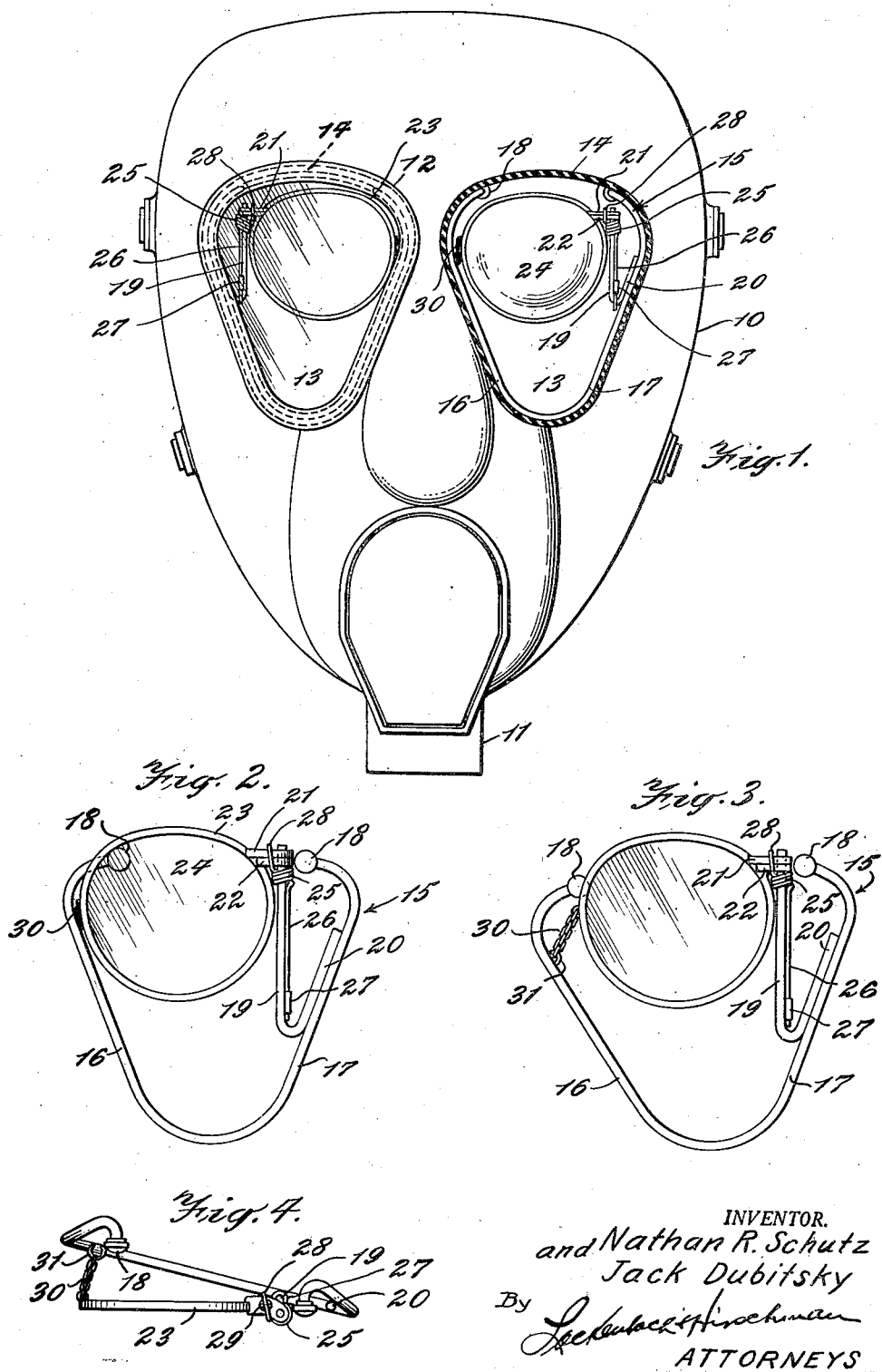

2,388,713

UNITED STATES PATENT OFFICE 2,388,713

ADJUSTABLE LENS MOUNT FOR GAS MASKS

Nathan R. Schutz and Jack Dubitsky, New York, N. Y., assignors of one-third to Alfred H. Sachs, Cleveland, Ohio Application January 8, 1943, Serial No. 471,658

12 Claims. (Cl. 88—41)

Our invention relates to lens mountings for masks of various types whereby ground lenses may be easily and conveniently, and at the same time, detachably secured within a mask to be worn by persons requiring optical correction.

The present invention is an improvement over the structures described in our copending application, Serial No. 465,478, filed November 9, 1942.

It is the object of the invention to provide a lens mount which can be readily inserted and supported within masks of various kinds and thereby become a more or less permanent part thereof, while yet maintaining the removability and replaceability of the lens and lens frames, together with their mounts, means being provided for effecting vertical adjustment and also horizontal angular adjustment about a vertical axis so as to make one and the same mount suitable for use in different types of mask and for persons having different facial contours, eye distances, etc.

While our improved lens mount structure can be incorporated in various kinds of masks, such as welders', miners', firemen's, airmen's, divers', and other masks, it is of particular advantage in gas masks for combat units and especially those which fit closely about and follow the contours of the face and the invention will accordingly be further described in detail in connection with a gas mask, such description to be understood as illustrative only, and not as limiting the scope of the invention.

The use of gas masks by soldiers and civilians who must wear glasses has presented a rather serious problem with the equipment that has to date been made available. A separate pair of glasses must be provided for each soldier, which glasses and their frames are constructed to fit within the gas mask; or else, the mask is constructed to fit over the whole head, as well as the face, so as thereby to enclose the glasses normally worn by the soldier. The first type of equipment is objectionable because of the extremely short time available, usually a matter of only about eight seconds, between the gas alarm and the time that the mask must be snugly fitted on the face to protect the wearer both against lachrymator and lung-attacking gases, as well as vesicant gases. The soldier must not only remove the glasses he is wearing, but fit on the special gas mask glasses before he can don his mask. Where the gas mask glasses have been misplaced, or are not readily available, valuable time may be lost, with danger of injury and even death. Also, in the excitement of the moment, there is considerable danger that one of the two pairs of glasses will be damaged. A further objection to this type of equipment is that the temple bars provide points of ingress for gas, since the facial masks cannot ordinarily fit tightly about such bars.

The second type of equipment is objectionable not only because of the large size of a mask required to fit over the whole head, but also because it becomes more difficult to insure adequate sealing against the back of the head and the neck.

It has occurred to us that it is both desirable and possible to provide a lens-mount structure for gas masks, which becomes practically a permanent part of the mask and yet is conveniently removable for adjustment, replacement, or repair. We have accordingly incorporated in a gas mask having any suitable body structure and the usual glass or other transparent lenses or windows seated in suitable frames in the mask, a novel type of support and attachment which is characterized by a number of important features and advantages over prior gas mask equipment. Aside from the fact that the optically ground lenses become a more or less fixed part of the mask, so that the soldier has but to remove his ordinary glasses and don his mask to meet any emergency, our improved lens mount provides a greater range of vision than was possible with the gas mask spectacles heretofore manufactured; and in a preferred embodiment of our invention, the lens frames are made adjustable to accommodate themselves to different facial widths. Thus, whereas the spectacles provided by the United States Army for use with gas masks have a diameter of only 35 mm., which cuts the field of vision by about 30%, and thus consequently greatly handicaps the soldier, the lenses used with our improved mounts can be of the usual size. Also, even where only one type of lens mount is manufactured in accordance with the present invention, the same can be made to fit soldiers having narrow or wide faces by reason of the provision of an adjustment which is described more fully hereinbelow.

In the construction of the present invention, temple bars are completely eliminated with consequent elimination of danger of seepage of gas into the interior of the mask at the temples.

In addition to the adjustability of the lens frame in a more or less vertical direction, we provide also adjustable means for determining the angular position of the lens frame, so that the lens centers can be brought into the proper positions for any particular individual.

The invention will be described in further detail with the aid of the attached drawing forming part of this specification, the same illustrating a satisfactory form of the invention without, however, limiting the same thereto. In said drawing, Fig. 1 is a front elevation partly in section, of a mask having our improved lens mount incorporated therein;

Fig. 2 is an elevational view of the lens mount, as seen from the rear, the mounting frame being contracted preliminary to insertion in a window frame of the mask;

Fig. 3 shows the lens mount in released condition; and

Fig. 4 is a top plan view of the structure in the condition shown in Fig. 2.

The mask 10 is of any known or suitable type, the one illustrated being a known form of gas mask. It is provided with the usual window frames 12 within which are seated the windows 13, which may be made of glass or other suitable transparent material. The frames 12 are usually made of rubber, but they may also be formed of metal, rubber-coated metal, or any other suitable material. The mask is provided with the usual connection 11, to which is applied a hose leading into any suitable filter or cartridge. The window frames 12 are provided upon their inner surfaces with a flange or the like 14 within which the windows are fitted.

The structure of the present invention is shown more in detail in Figs. 2 to 4 and comprises a mounting member shown generally at 15, which is roughly of V-form and is open at the top, the ends being separated and provided with finger pieces 18 in the form of knobs, for a purpose which will be explained hereinafter. Figs. 2 and 3 show the structure as viewed from the rear, i. e. from the eye of the wearer, and the side 16 is adapted to be positioned near the nose bridge, while the side 17 is on the temple side of the mask. The member 15 is preferably made of oil-tempered steel wire about 0.091 inch in diameter. Its function is to anchor the lens mount as a whole within the mask and to this end, the knobs 18 are engaged by the thumb and index finger and contracted, as shown in Fig. 2, whereupon the wire member can be fitted within the flange 14 of the window frame 12; upon release of the knobs 18, the wire mounting 15 expands and resiliently engages the flange 14 and becomes securely anchored within the latter.

A substantially vertical rod 19, which may be of soft, untempered steel about 0.065 inch in diameter is secured to the temple side 17 in any suitable manner, as by means of an extension 20, which is welded, soldered, or otherwise secured to the side 17. The rod 19 passes through aligned apertures at the ends of lugs 21 and 22 projecting horizontally from the ends of a lens frame 23 of more or less usual construction, so that the frame 23, together with the lens 24 mounted therein, can slide vertically upon the rod 19 and the lens center thereby adjusted with reference to the eye of the wearer. A coiled spring 25 surrounds the rod 19, the spring being made, for example, of 0.026 inch tension spring wire. The upper end 28 of the spring engages the lugs 21, 22 in a manner to urge the frame 23 toward the eye, that is, away from the mounting member 15. The other end 26 of the spring consists of a straight portion running more or less parallel to the rod 19 and passing through a guide sleeve 27 secured at approximately the bottom end of the rod 19. The sleeve may be in the form of thin brass tubing having an approximately 0.028 inch bore. The length of the portion 26 may be, and preferably is longer than as is shown in Figs. 2 and 3, and upon adjustment of the lens frame 23 to the proper vertical position, the excess below the sleeve 27 may be cut off, the lower end being, if desired, slightly bent beneath and/or above the sleeve 27 to prevent displacement of the lens frame from the adjusted position.

The lugs 21 and 22 are secured to each other in the usual manner by means of a screw 29 whereby the frame 23 is tightened and the lens 24 is securely clamped therewithin.

Our invention also includes means for adjustably limiting the angular movement of the frame 23 under the influence of the spring 25. In the embodiment of the invention illustrated, this means comprises a link chain 30, one end of which is soldered or otherwise secured to the frame 23, while the other end is attached to a hook member 31 which is made of soft steel, copper or the like, and is fixed at one end to the side 16 of the mounting member. The chain may be composed of as many as seventeen links and is about 1¼ inches in length. Each link acts as a unit of adjustment and the angular displacement of the frame 23 with reference to the mounting member 15 can be adjusted by selectively engaging one of the links with the hook 31, the excess length of chain being, if desired, cut off. It will be seen from the foregoing that we have provided a lens mount of simple structure which can be easily anchored within the window frames of standard and other masks and which permits both vertical and horizontally angular adjustment of the lens frame, so that practically perfect adjustment of the lenses to the eyes of wearers of different facial contours and dimensions can be readily secured. In particular, it will be noted that the lens frame can be of any standard or common type in general use and may, for example, be the Standard Boston shape "Fullvue." The lens can be made 44 mm. wide and 38 mm. high and the lens may be a bifocal or of any other special prescription. When the member 15 is mounted within the mask, the latter protects the lens and its supported parts against injury and the parts are quite safe against breakage or displacement even with rough handling of the mask. The parts are made of standard wire and similar simple parts and require no special machining or high precision, so that the mount can be easily manufactured in large quantities at low cost.

Instead of being bent over the lugs 21, 22, the upper end 28 of the spring could be made to pass through a suitable aperture formed in the lugs and if desired, bent over the upper edge of the aperture. Also, the lower or end portion of the rod 19 might be bent to form a loop through which the lower end 26 of the spring could be passed, and thereby the guide sleeve 27 dispensed with.

We claim:

1. A mask of the class described, comprising a body portion having a pair of transparent windows and relatively shallow frames within which the windows are seated, a pair of lens frames positioned at the inside of the mask behind the windows and adapted to receive a pair of lenses and support the same between the windows and the eyes of the wearer, a resilient wire mounting member for each of the lens frames adapted upon contraction to be fitted within the window frames and upon release, to bear resiliently against such frames to anchor the lens frames firmly within the mask, the lens frames being disposed in planes rearward of the planes of the mounting members, and the ends of the mounting members being separated from each other at the tops of such members in the normal position thereof within the window frames and no portion of the mounting member extending rearwardly of the planes of said lens frames, and adjustable connecting means between each mounting member, and its associated lens frame, for enabling the lenses to be centered and to be adjusted to the eye distances of different wearers of the mask.

2. A mask as defined in claim 1, wherein the ends of the mounting members are provided with finger pieces which lie substantially in the planes of the mounting members.

3. A pliable mask of the type which follows the contours of the face, comprising a body portion having a pair of transparent windows and relatively shallow frames within which the windows are seated, a pair of lens frames positioned at the inside of the mask behind the windows and adapted to receive a pair of lenses and support the same between the windows and the eyes of the wearer, and a resilient wire mounting member for each of the lens frames adapted upon contraction to be fitted within the window frames and upon release, to bear resiliently against such frames to anchor the lens frames firmly within the mask, the lens frame being supported upon its mounting member by way of a substantially vertical rod secured to the mounting member at the temple side of the latter and upon which rod the lens frame is vertically slidable to effect adjustment of the lens.

4. A mask as defined in claim 3, wherein the lens frame is rotatable on the rod and including a spring urging the lens frame away from the mounting member, and adjustable means at the bridge side of the lens frame for limiting the movement of the lens frame, whereby the angular position of the lens frame may be adjusted for different facial widths.

5. A pliable mask of the type which follows the contours of the face, comprising a body portion having a pair of transparent windows and relatively shallow frames within which the windows are seated, a pair of lens frames positioned at the inside of the mask behind the windows and adapted to receive a pair of lenses and support the same between the windows and the eyes of the wearer, and a resilient wire mounting member for each of the lens frames adapted upon contraction to be fitted within the window frames, and upon release to bear resiliently against such frames to anchor the lens frames firmly within the mask, the lens frames being positioned rearwardly of the mounting members and means for supporting the lens frames for vertical adjustment on the mounting members.

6. A mask as defined in claim 5, wherein the supporting means comprises a vertical rod secured to each of the mounting members, the lens frames being slidable on said rods, and being also pivoted upon said rods for angular adjustment to compensate for different facial contours of wearers of the mask.

7. A pliable mask of the type which follows the contours of the face comprising a body portion having a pair of transparent windows and frames within which the windows are seated, a pair of lens frames positioned at the inside of the mask behind the windows and adapted to receive a pair of lenses and support the same between the windows and the eyes of the wearer, a mounting member for each of the lens frames adapted to be fixed within the mask, and means for supporting the lens frames upon the mounting members for both vertical and horizontal angular adjustment.

8. A mask of the class described, comprising a body portion having a pair of transparent windows and frames within which the windows are seated, a pair of lens frames positioned at the inside of the mask behind the windows and adapted to receive a pair of lenses and support the same between the windows and the eyes of the wearer, a mounting member for each of the lens frames adapted to be fixed upon the inside of the mask in the region of the windows, the lens frames being split to facilitate insertion and removal of a lens, the ends of such frames being provided with horizontally extending lugs, means for securing said lugs to each other to clamp the lens within the frame, the outer ends of the lugs being apertured, a substantially vertical rod secured to each mounting member and passing through said apertures, the lens frames being rotatable on said rods, a spring coiled about the rod and bearing against the lugs at one end, a guide sleeve upon the rod through which the other end of the spring passes, and means for limiting the angular movement of the lens frames under the influence of the springs.

9. A lens mount for pliable masks of the type which follows the contours of the face comprising a mounting member in the form of a resilient wire whose ends are separated at the top of the member and are provided with finger pieces, said member being adapted to be inserted inside a mask and within a window frame thereof, a substantially vertical rod secured to the temple side of the mounting member and spaced therefrom, a lens frame mounted for vertical sliding movement and for horizontal rotation on said rod and disposed rearwardly of the mounting member so as to be positioned, when in use, inside of the mask, a spring acting on the lens frame and urging pivotal movement in a horizontal direction, and means for limiting the horizontal movement of the lens frame.

10. A lens mount for pliable masks of the type which follows the contours of the face comprising a mounting member in the form of an approximately V-shaped resilient wire structure which is adapted to be compressed and inserted within a window frame of the mask at the inside thereof, the ends of the member being at the top thereof and spaced from each other, said ends being provided with finger pieces to facilitate gripping thereof, a substantially vertical rod secured to the temple side of the mounting member and spaced therefrom, a split lens frame provided with horizontally extending lugs at its adjacent ends, a screw for securing said lugs to each other and thereby clamping a lens within the frame, the ends of the lugs being apertured and being fitted upon the vertical rod for rotation thereon, a spring coiled about the rod and urging the lens frame away from the mounting member, adjustable means for limiting the angular movement of the lens frame, the other end of the spring being constituted of a straight portion extending parallel to the rod, and a guide sleeve secured to the bottom of the rod and receiving the straight portion of the spring, the lens frame being also vertically adjustable upon the rod.

11. A mask of the class described, comprising a body portion having a pair of transparent windows and frames within which the windows are seated, a pair of lens frames positioned at the inside of the mask behind the windows and adapted to receive a pair of lenses and support the same between the windows and the eyes of the wearer, and a resilient wire mounting member for each of the lens frames adapted upon contraction to be fitted within the window frames and upon release, to bear resiliently against such frames to anchor the lens frames firmly within the mask, the lens frame being supported upon its mounting member by way of a substantially vertical rod secured to the mounting member and upon which the lens frame is vertically slidable to effect adjustment of the lens, the lens frame being also pivotable on said rod, a spring urging the lens frame away from the mounting member, and a link chain connecting the lens frame and mounting member and adjustable in length so as to determine the angular position of the lens frame.

12. A mask of the class described, comprising a body portion having a pair of transparent windows and frames within which the windows are seated, a pair of lens frames positioned at the inside of the mask behind the windows and adapted to receive a pair of lenses and support the same between the windows and the eyes of the wearer, a mounting member for each of the lens frames adapted to be fixed within the mask, and means for supporting the lens frames upon the mounting members for both vertical and horizontally angular adjustment, said supporting means including a substantially vertical rod secured to each of the mounting members, the lens frames being provided with an apertured lug through which the respective rods are passed to enable the lens frames to be vertically adjustable and horizontally rotatable on said rods, a spring coiled about each of the rods and having one end portion thereof engaging the lug in a manner to urge the respective lens frame toward the eye of the wearer, the other end portion of the spring being relatively straight, means for limiting the rotation of the lens frames, and a guide sleeve secured to the rod and receiving the straight portion of the spring.

NATHAN R. SCHUTZ.
JACK DUBITSKY.